A. C. BROWN.
RAPID COMPRESSION COCK.
APPLICATION FILED FEB. 14, 1913.
1,148,441.
Patented July 27, 1915.
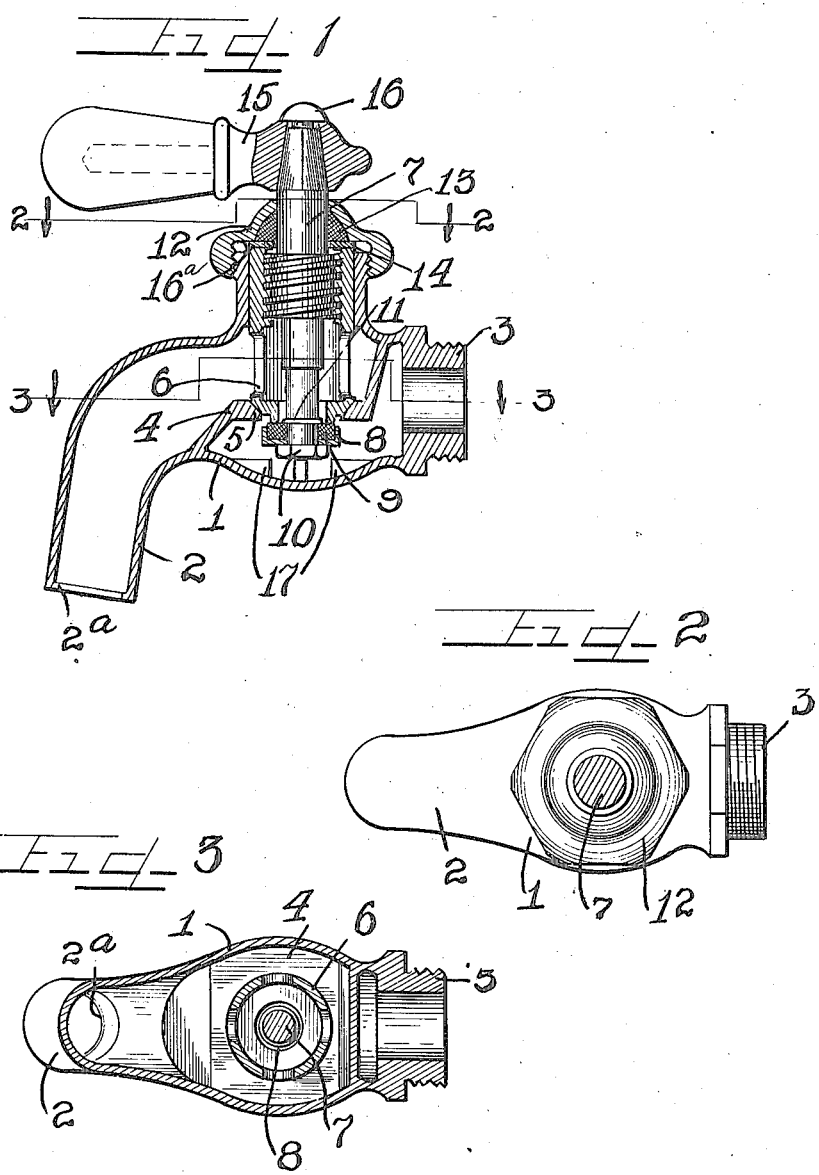

UNITED STATES PATENT OFFICE.

ALBERT C. BROWN, OF CHICAGO, ILLINOIS.

RAPID-COMPRESSION COCK.

1,148,441.  Specification of Letters Patent.  Patented July 27, 1915.

Application filed February 14, 1913. Serial No. 748,291.

*To all whom it may concern:*

Be it known that I, ALBERT C. BROWN, a citizen of the United States, and a resident of the city of Chicago, in the county of Cook and State of Illinois, have invented certain new and useful Improvements in Rapid-Compression Cocks; and I do hereby declare that the following is a full, clear, and exact description of the same, reference being had to the accompanying drawings, and to the numbers of reference marked thereon, which form a part of this specification.

Numerous types of compression cocks have been heretofore devised, some of which have been quite complicated, but most of which have been difficult to assemble, and also difficult to disassemble for purposes of repair. Furthermore, many of such cocks have been so constructed as to leak through the top of the cock when subjected to any excessive water pressure while discharging.

It is an object of this invention to provide a construction of the utmost simplicity, durability, and utility for the purpose described, and to afford a construction adapted to be very easily and quickly assembled or disassembled.

It is also an object of the invention to provide a cock having a threaded stem adapted to be threaded within a complementally threaded sleeve and extend therethrough in such a manner that the closure on the same will engage or seat upon the lower end of the sleeve.

It is also an object of this invention to provide a valve closure and seat adapted to be inserted into or removed from a cock in assembled condition.

It is also an object of this invention to provide means on the casing for limiting the opening of the valve closure.

It is a further object of this invention to provide a cock having a spout or nozzle adapted to solidify the stream of water as it passes therethrough.

It is an important object of this invention to provide a cock having a cap threaded on the upper end thereof adapted to fit firmly against the upper end of a sleeve affording a valve closure to hold the same firmly in position.

It is also an object of this invention to provide a cock having a minimum number of parts, which will be cheap to construct, and maintain, and which will not be likely to get out of order or require renewal of parts.

It is also an object of the invention to provide a faucet closing with the pressure, in which all parts are accessible for renewal or repair, without breaking body joints.

The invention (in a preferred form) consists in the matters hereinafter described and more fully pointed out and defined in the appended claims.

In the drawings: Figure 1 is a vertical section of a device embodying my invention. Fig. 2 is a section taken on line 2—2 of Fig. 1. Fig. 3 is a section taken on line 3—3 of Fig. 1.

As shown in the drawings: 1, indicates the body of the cock affording an interior chamber, from which opens the spout or nozzle 2, provided at its end with an inwardly directed flange 2$^a$, and 3, indicates a tubular connection for the fluid distribution system. A centrally apertured partition 4, is provided in said body 1, intermediate the nozzle 2, and the tubular portion 3, and is ground or otherwise shaped to afford a conical seat 5, in which is seated the conical tapered end of a sleeve 6, the lower end of which is reduced and extends below said partition to afford a downwardly facing valve seat. The sleeve 6, is provided with apertures therethrough above the partition 4, to permit the discharge of fluid therefrom to the nozzle. As shown in Fig. 1, the upper end of said sleeve 6, is internally threaded and a complementally threaded valve stem 7, is threaded therein and extends beyond the lower end of the sleeve. A plate 8, recessed on its upper side and provided with a packing washer 9, is rigidly secured on the lower end of said stem 7, by means of a suitable nut or screw 10, in such a position that the packing 9, will be firmly engaged between said metallic plate 8, and the flange 11, on the lower end of the valve stem. The upper end of said body 1, is externally screw threaded and is bored to a size to permit insertion of the sleeve 6, within the same. A screw cap 12, is provided on the upper end of said casing 1, and the concave top thereof is filled with suitable packing material 13, adapted to prevent leakage between the same and the stem 7. As shown in Fig. 1, said screw cap 12, bears firmly against the packing ring 14, on the upper end of the sleeve 6, and forces said sleeve downwardly firmly against the conical seat 5, of the partition to afford a watertight construction. The usual or any preferred handle 15, is secured on the angular end of the stem 7, by means of a screw 16. The bottom of the casing is provided with lugs 17, which serve to limit the downward movement of the valve stem and closure by contact with the retaining plate 8.

In assembling the device the valve stem 7, is first threaded through the sleeve 6, in position so that the closure on the end of the same will seat against the lower end of the sleeve 6. The cap 12, is then inserted over the rectangular end of the stem, and the sleeve and stem are inserted within the body 1, of the cock. The cap 12, is then threaded upon the body in such a manner that the flange 16ª, of the same will firmly engage the packing ring 14, on the top of the sleeve and force the sleeve against the conical seat 5, of the partition 4, and thus hold the same firmly in place. When the sleeve 6, has been inserted in the body it projects through and beyond the partition 4, and affords a downwardly facing valve seat for the closure on the stem 7. In view of the fact that the sleeve 6 and stem 7, are independent of any integral connection with the body of the cock, it is possible to insert the same within the body, so that the handle 15 may assume any desired position with respect to the body 1.

If it is desired to inspect or renew any of the parts of the cock, the cap 12, is unthreaded from the body 1, and the cap, sleeve and closure may then be removed from the body without any further adjustment or removal of parts.

The operation is believed to be obvious from the construction described. After the cock has been assembled as has been previously described, the valve may be opened by a slight rotation of the handle 15, to permit the flow of water through the nozzle or spout 2, and against the flange 2ª, which solidifies the stream as it leaves the cock.

Of course it is obvious from the construction described that details of construction may be varied without departing from the spirit of the invention. I therefore do not purpose limiting the patent granted otherwise than necessitated by the prior art.

I claim as my invention:

1. In a device of the character described, a chambered body having a nozzle at one side thereof and an inlet opening on the other side, a partition disposed intermediate said openings and having a seat aperture therein, a sleeve extending through said body but projecting at its upper end above said body, said sleeve resting at its lower end on said seat in said partition, a valve stem in threaded engagement with said sleeve and extending through the same, a closure on the lower end of said stem adapted to engage the lower end of the sleeve, and a cap in screw threaded engagement with the top of said body and adapted to force said sleeve to its seat in said partition.

2. In a device of the character described, a chambered body, a partition therein having a conical opening therethrough, a seat member comprising an internally threaded sleeve extending from the top of said body to said partition but projecting at its upper end above said body, said sleeve being provided with a conical end which seats in the conical opening in said partition, and having a reduced end extending through said partition, a valve stem in threaded engagement with said sleeve and extending through the same, a closure on the lower end of the valve stem adapted to seat against the reduced end of said seat member, and a cap in screw threaded engagement with the upper end of said body and acting against the upper end of said sleeve to force the same firmly in position against the seat in said partition.

In testimony whereof I have hereunto subscribed my name in the presence of two subscribing witnesses.

ALBERT C. BROWN.

Witnesses:
C. W. HILLS,
LAWRENCE REIBESTEIN.